US007814198B2

(12) United States Patent
Christensen et al.

(10) Patent No.: US 7,814,198 B2
(45) Date of Patent: Oct. 12, 2010

(54) MODEL-DRIVEN, REPOSITORY-BASED APPLICATION MONITORING SYSTEM

(75) Inventors: Erik B. Christensen, Seattle, WA (US); Igor Sedukhin, Issaquah, WA (US); Amol Sudhakar Kulkarni, Bothell, WA (US); Mariusz G. Borsa, Redmond, WA (US); Haoran Andy Wu, Sammamish, WA (US); Mandyam N. Kishore, Redmond, WA (US); Leo S. Vannelli, III, North Bend, WA (US); Anubhav Dhoot, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 11/925,326

(22) Filed: Oct. 26, 2007

(65) Prior Publication Data

US 2009/0112559 A1    Apr. 30, 2009

(51) Int. Cl.
*G06F 15/13* (2006.01)
(52) U.S. Cl. .................. 709/224; 709/203; 709/204; 709/212; 709/225
(58) Field of Classification Search ............... 709/203, 709/224, 225, 204, 212; 707/100
See application file for complete search history.

(56) References Cited

U.S. PATENT DOCUMENTS

| 4,751,635 | A | 6/1988 | Kret |
| 5,423,003 | A | 6/1995 | Berteau |
| 5,602,991 | A | 2/1997 | Berteau |
| 5,655,081 | A | 8/1997 | Bonnell |
| 5,764,241 | A | 6/1998 | Elliott |
| 5,809,266 | A | 9/1998 | Touma |
| 5,893,083 | A | 4/1999 | Eshghi |
| 5,937,388 | A | 8/1999 | Davis et al. |
| 5,958,010 | A | 9/1999 | Agarwal |

(Continued)

FOREIGN PATENT DOCUMENTS

EP    1770510    4/2007

(Continued)

OTHER PUBLICATIONS

U.S. Appl. No. 12/105,083, filed Apr. 17, 2008 (Not Yet Published).

(Continued)

*Primary Examiner*—Jinsong Hu
(74) *Attorney, Agent, or Firm*—Workman Nydegger

(57) ABSTRACT

Enabling and processing events. To enable events, an application model correlated to an application is declaratively defined. The application model describes operations of the application. One or more event models correlated to the application model are declaratively defined. The event models describe application execution locations where events are desired to be emitted in the execution of the application. Based on the correlation of the event models to the application models, the applications are instrumented with instrumentation code to cause the application to emit events at the execution locations. To process events an application model is defined. The application model includes one or more observation models. The observation models include a correlation of events to the observation model by defining instrumentation models in the application model. An event is received. The event is applied to the observation model based on the correlation. The event is processed according to the observation model.

18 Claims, 7 Drawing Sheets

U.S. PATENT DOCUMENTS

| | | | |
|---|---|---|---|
| 6,026,404 A | 2/2000 | Adunuthula | |
| 6,055,363 A | 4/2000 | Beals et al. | |
| 6,070,190 A | 5/2000 | Reps | |
| 6,225,995 B1 | 5/2001 | Jacobs | |
| 6,247,056 B1 | 6/2001 | Chou | |
| 6,279,009 B1 | 8/2001 | Smirnov et al. | |
| 6,330,717 B1 | 12/2001 | Raverdy | |
| 6,334,114 B1 | 12/2001 | Jacobs | |
| 6,336,217 B1 | 1/2002 | D'Anjou et al. | |
| 6,477,665 B1 | 11/2002 | Bowman-Amuah | |
| 6,618,719 B1 | 9/2003 | Andrei | |
| 6,640,241 B1 * | 10/2003 | Ozzie et al. | 709/204 |
| 6,654,783 B1 * | 11/2003 | Hubbard | 709/202 |
| 6,662,205 B1 | 12/2003 | Bereiter | |
| 6,697,877 B1 | 2/2004 | Martin | |
| 6,710,786 B1 | 3/2004 | Jacobs | |
| 6,715,145 B1 | 3/2004 | Bowman-Amuah | |
| 6,718,535 B1 | 4/2004 | Underwood | |
| 6,801,818 B2 | 10/2004 | Kopcha | |
| 6,847,970 B2 | 1/2005 | Keller et al. | |
| 6,854,069 B2 | 2/2005 | Kampe | |
| 6,886,024 B1 | 4/2005 | Fujita | |
| 6,907,395 B1 | 6/2005 | Hunt | |
| 6,931,644 B2 | 8/2005 | Riosa | |
| 6,934,702 B2 | 8/2005 | Faybishenko | |
| 6,941,341 B2 | 9/2005 | Logston | |
| 7,051,098 B2 | 5/2006 | Masters | |
| 7,055,143 B2 | 5/2006 | Ringseth et al. | |
| 7,065,579 B2 | 6/2006 | Traversat | |
| 7,072,807 B2 | 7/2006 | Brown | |
| 7,072,934 B2 | 7/2006 | Helgeson | |
| 7,079,010 B2 | 7/2006 | Champlin | |
| 7,085,837 B2 | 8/2006 | Kimbrel | |
| 7,096,258 B2 | 8/2006 | Hunt | |
| 7,103,874 B2 | 9/2006 | McCollum | |
| 7,130,881 B2 | 10/2006 | Volkov et al. | |
| 7,150,015 B2 | 12/2006 | Pace et al. | |
| 7,155,380 B2 | 12/2006 | Hunt | |
| 7,155,466 B2 | 12/2006 | Rodriguez | |
| 7,162,509 B2 | 1/2007 | Brown et al. | |
| 7,168,077 B2 | 1/2007 | Kim | |
| 7,174,359 B1 | 2/2007 | Hamilton, II et al. | |
| 7,178,129 B2 | 2/2007 | Katz | |
| 7,200,530 B2 | 4/2007 | Brown | |
| 7,219,351 B2 | 5/2007 | Bussler et al. | |
| 7,263,689 B1 | 8/2007 | Edwards et al. | |
| 7,512,707 B1 | 3/2009 | Manapragada | |
| 2002/0038217 A1 | 3/2002 | Young | |
| 2002/0099818 A1 | 7/2002 | Russell | |
| 2002/0111841 A1 | 8/2002 | Leymann | |
| 2002/0120917 A1 | 8/2002 | Abrari et al. | |
| 2002/0133504 A1 | 9/2002 | Vlahos et al. | |
| 2002/0135611 A1 | 9/2002 | Deosaran | |
| 2002/0147515 A1 | 10/2002 | Fava et al. | |
| 2002/0147962 A1 | 10/2002 | Hatanaka | |
| 2002/0198734 A1 | 12/2002 | Greene | |
| 2003/0005411 A1 | 1/2003 | Gerken | |
| 2003/0061342 A1 | 3/2003 | Abdelhadi | |
| 2003/0084156 A1 | 5/2003 | Graupner et al. | |
| 2003/0135384 A1 | 7/2003 | Nguyen | |
| 2003/0149685 A1 | 8/2003 | Trossman | |
| 2003/0195763 A1 | 10/2003 | Gulcu | |
| 2004/0034850 A1 | 2/2004 | Burkhardt | |
| 2004/0046785 A1 | 3/2004 | Keller | |
| 2004/0078461 A1 * | 4/2004 | Bendich et al. | 709/224 |
| 2004/0088350 A1 * | 5/2004 | Early | 709/203 |
| 2004/0102926 A1 | 5/2004 | Adendorff | |
| 2004/0148184 A1 | 7/2004 | Sadiq | |
| 2004/0162901 A1 | 8/2004 | Mangipudi | |
| 2005/0005200 A1 | 1/2005 | Matena et al. | |
| 2005/0044214 A1 | 2/2005 | Schwertfuehrer | |
| 2005/0055692 A1 | 3/2005 | Lupini | |
| 2005/0071737 A1 | 3/2005 | Adendorff | |
| 2005/0074003 A1 | 4/2005 | Ball | |
| 2005/0091227 A1 * | 4/2005 | McCollum et al. | 707/100 |
| 2005/0120106 A1 | 6/2005 | Albertao | |
| 2005/0125212 A1 | 6/2005 | Hunt et al. | |
| 2005/0132041 A1 | 6/2005 | Kundu | |
| 2005/0137839 A1 | 6/2005 | Mansurov | |
| 2005/0155042 A1 | 7/2005 | Kolb et al. | |
| 2005/0165906 A1 * | 7/2005 | Deo et al. | 709/217 |
| 2005/0188075 A1 | 8/2005 | Dias | |
| 2005/0216831 A1 | 9/2005 | Guzik | |
| 2005/0261875 A1 | 11/2005 | Shrivastava | |
| 2005/0268307 A1 | 12/2005 | Gates et al. | |
| 2005/0278702 A1 | 12/2005 | Koyfman | |
| 2005/0283518 A1 | 12/2005 | Sargent | |
| 2006/0010142 A1 | 1/2006 | Kim | |
| 2006/0010164 A1 | 1/2006 | Netz | |
| 2006/0013252 A1 | 1/2006 | Smith | |
| 2006/0036743 A1 | 2/2006 | Deng | |
| 2006/0064460 A1 | 3/2006 | Sugawara | |
| 2006/0070066 A1 | 3/2006 | Grobman | |
| 2006/0070086 A1 | 3/2006 | Wang | |
| 2006/0074734 A1 | 4/2006 | Shukla | |
| 2006/0123389 A1 | 6/2006 | Kolawa et al. | |
| 2006/0123412 A1 | 6/2006 | Hunt | |
| 2006/0155738 A1 | 7/2006 | Baldwin | |
| 2006/0173906 A1 | 8/2006 | Chu et al. | |
| 2006/0206537 A1 | 9/2006 | Chiang | |
| 2006/0230314 A1 | 10/2006 | Sanjar | |
| 2006/0235859 A1 | 10/2006 | Hardwick | |
| 2006/0265231 A1 | 11/2006 | Fusaro et al. | |
| 2006/0277323 A1 | 12/2006 | Joublin | |
| 2006/0277437 A1 | 12/2006 | Ohtsuka | |
| 2006/0294506 A1 | 12/2006 | Dengler | |
| 2007/0005283 A1 | 1/2007 | Blouin | |
| 2007/0005299 A1 | 1/2007 | Haggerty | |
| 2007/0006122 A1 | 1/2007 | Bailey et al. | |
| 2007/0016615 A1 | 1/2007 | Mohan et al. | |
| 2007/0033088 A1 | 2/2007 | Aigner et al. | |
| 2007/0050237 A1 | 3/2007 | Tien | |
| 2007/0050483 A1 | 3/2007 | Bauer et al. | |
| 2007/0061776 A1 | 3/2007 | Ryan et al. | |
| 2007/0067266 A1 | 3/2007 | Lomet | |
| 2007/0088724 A1 | 4/2007 | Demiroski | |
| 2007/0089117 A1 | 4/2007 | Samson | |
| 2007/0094350 A1 | 4/2007 | Moore | |
| 2007/0112847 A1 | 5/2007 | Dublish | |
| 2007/0174228 A1 | 7/2007 | Folting | |
| 2007/0174815 A1 | 7/2007 | Chrysanthakopoulos et al. | |
| 2007/0179823 A1 | 8/2007 | Bhaskaran | |
| 2007/0208606 A1 | 9/2007 | MacKay | |
| 2007/0220177 A1 | 9/2007 | Kothari | |
| 2007/0277109 A1 | 11/2007 | Chen | |
| 2008/0010631 A1 | 1/2008 | Harvey et al. | |
| 2008/0244423 A1 | 10/2008 | Jensen-Pistorius | |
| 2009/0187662 A1 | 7/2009 | Manapragada | |
| 2009/0265458 A1 | 10/2009 | Baker | |
| 2010/0005527 A1 | 1/2010 | Jeon | |

FOREIGN PATENT DOCUMENTS

| | | | |
|---|---|---|---|
| WO | 0124003 | 4/2001 | |
| WO | WO 0227426 A2 | 4/2002 | |
| WO | 2007072501 | 6/2007 | |

OTHER PUBLICATIONS

Office Action dated Mar. 2, 2010 cited in U.S. Appl. No. 11/771,816.
Office Action dated Mar. 18, 2010 cited in U.S. Appl. No. 11/740,737.
U.S. Appl. No. 11/844,177, filed Aug. 23, 2007, Sedukhin.
U.S. Appl. No. 11/740,737, filed Apr. 26, 2007, Sedukhin.
U.S. Appl. No. 11/771,827, filed Jun. 29, 2007, Sedukhin.

U.S. Appl. No. 11/771,816, filed Jun. 29, 2007, Sedukhin.
U.S. Appl. No. 11/925,079, filed Oct. 26, 2007, Bhaskar.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pages. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pages. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platfom", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.

Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar El, et al., "Model Driven Provisionings: Bridging the Gap Between Declarative Object Models and Procedural Provisioning Tools", http://wcl.cs.rpi.edu/papers/middleware06.pdf.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
OSLO>Suite 2006, "OSLO Suite is the leading platform for designing, building and executing adaptive business solutions", http://www.oslo-software.com/en/product.php.
Korb, John T., et al., "Command Execution in a Heterogeneous Environment", 1986 ACM, pp. 68-74.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
Office Action dated Sep. 14, 2009 cited in U.S. Appl. No. 11/740,737.
Office Action dated Oct. 14, 2009 cited in U.S. Appl. No. 11/771,827.
Office Action dated Oct. 1, 2009 cited in U.S. Appl. No. 11/771,816.
Nastel Technologies, Inc., "AutoPilot Business Dashboard Configuration and User's Guide Version 4.4", 2006, AP/DSB 440.001, 82 pages.
TIBCO The Power of Now, "TIBCO BusinessFactor", 2006, 2 pages.
TIBCO, http://www.tibco.com/software/business_activity_monitoring/businessfactor/default.jsp, Copyright 2000-2007, 2 pages.
"Factal:Edge Enlists CMLgroup to Bring Visualization to Business Performance Management Clients", http://extranet.fractaledge.com/News/PressReleases/2006/060829, 2006, 2 pages.
Office Action dated Apr. 5, 2010 cited in U.S. Appl. No. 11/771,827.

* cited by examiner

MODEL-DRIVEN, REPOSITORY-BASED APPLICATION MONITORING SYSTEM

BACKGROUND

Background and Relevant Art

Computers and computing systems have affected nearly every aspect of modern living. Computers are generally involved in work, recreation, healthcare, transportation, entertainment, household management, etc.

Computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. Additionally, connections may include connections between entities on a common host, or connections of distributed applications to other distributed applications. The connections allow a computing system to access services at other computing systems and to quickly and efficiently receive application data from other computing system.

Often interconnected computer systems include large, complex and diverse implementations. Some applications in systems are multi-tiered and have many distributed components and subsystems some of which are long-running workflows and legacy or external systems. The distributed nature of applications and variety of implementations creates a challenge to enable and maintain distributed application monitoring. Points of interest in applications which should be monitored are implemented in varying technologies. Producing and consuming the monitoring events may take significant amount of custom coding today.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein is directed to a method performed in a distributed computing environment. The method includes acts for enabling events from applications. The method includes declaratively defining an application model correlated to an application. The application model describes operations of the application. One or more event models correlated to the application model are declaratively defined. The event models describe application execution locations where events are desired to be emitted in the execution of the application. Based on the correlation of the event models to the application models, the applications are instrumented with instrumentation code to cause the application to emit events at the execution locations.

In another embodiment, a method of processing events is disclosed. The method includes defining an application model. The application model includes one or more observation models. The observation models include a correlation of events to the observation model by defining instrumentation models in the application model. The method further includes receiving an event. The event is applied to the correlated observation model based on the correlation. The event is processed according to the observation model.

Yet another embodiment includes a monitoring system. The monitoring system includes a repository. The repository includes models of applications. The models of applications include instrumentation models correlated to application execution locations where events are desired to be emitted. The system further includes drivers coupled to repository. The drivers are configured to instrument application code based on the correlation of instrumentation models to application execution locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below. Some embodiments described herein provide services and frameworks to securely distribute, run, manage and operate on heterogeneous business process applications. Distributed applications are modeled declaratively and the models are stored in a repository. The framework executes commands to drive the applications through their software lifecycles.

Monitoring points, or event sources, are defined and attached to the applications. This can be accomplished by declaratively defining event models and correlating the event models with application models. This correlation is then used to instrument application code, which enables collecting events from individual application modules and aggregating them to better understand the overall health and/or the aggregated relevant variables of an application. These events are recorded in one or more data stores and used to adaptively control application behavior and its runtime environment. Some embodiments may include a decentralized runtime that is designed to support large number of connected hosts that are geographically distributed.

Figure 1A:
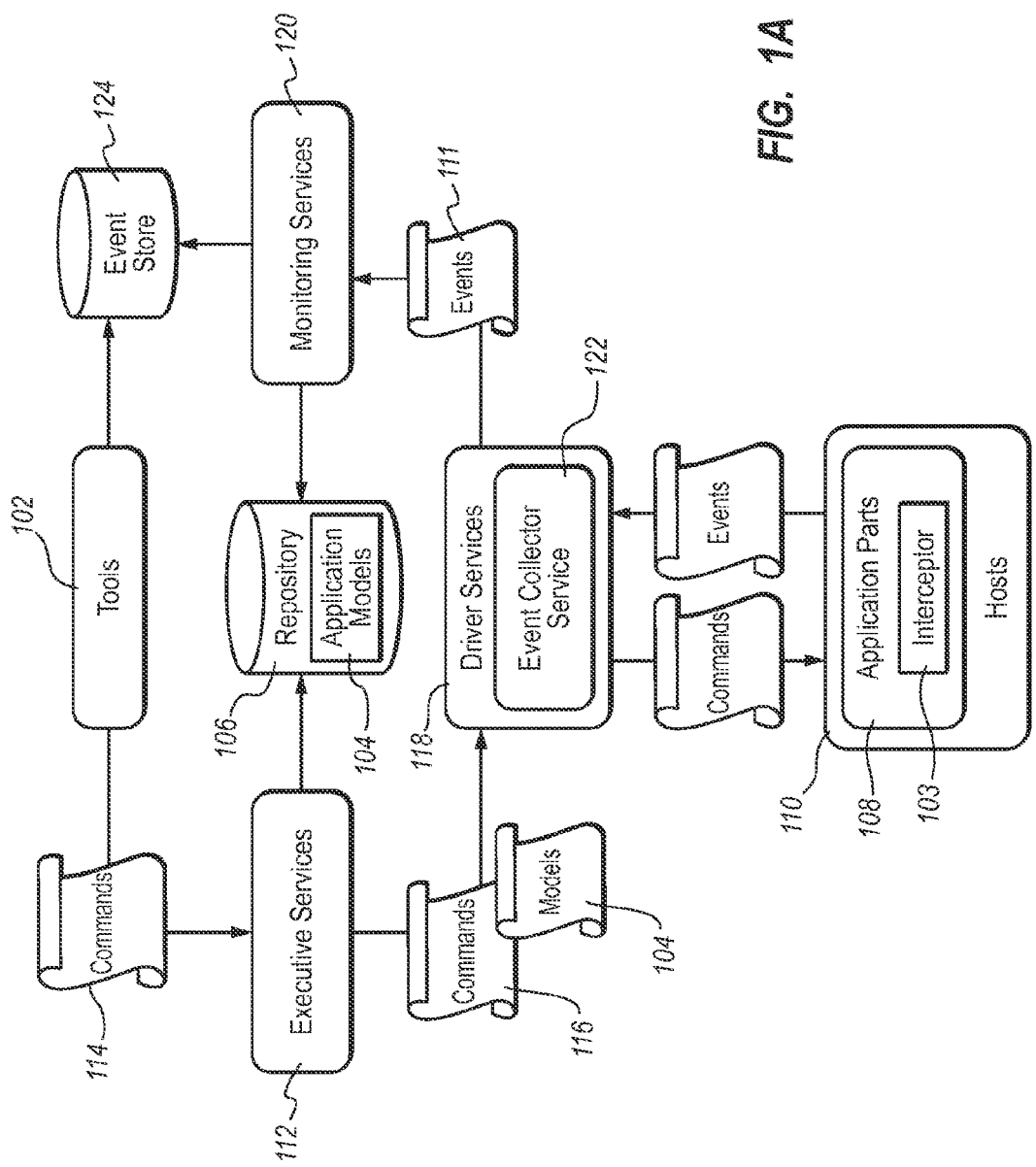
FIG. 1A illustrates a modeling and event generation architecture.

Referring now to FIG. 1A, an example embodiment is illustrated. FIG. 1A illustrates that tools 102 may be used to write declarative models 104 of composite applications to a repository 106. Declarative models 104 describe applications in terms of composition of application parts 108 and connections between application parts 108 as well as configuration and mapping of application parts 108 to hosts 110 that will run them. Note that applications may be distributed such that in some embodiments, only parts 108 of the application are implemented on any given host 110.

Tools 102 send commands 114 to executive services 112. Commands 114 are used to drive applications described by models 104 through their software lifecycles. Commands 114 carry references to the models 104 to which they apply. For example "start application 'app1'" is a kind of a command with a reference to the application "app1."

Executive services 112 facilitate carrying out a submitted command 114 by executing a model-described workflow that provides variable part values, such as machine name on which the application is to be run or network port numbers where the applications will be accepting requests, to the identified model 104. Executive services 112 may send more specific commands 116 to driver services 118. Driver services 118 translates the models 104 into ready to execute application's parts 108, deploys them to the hosts 110 in response to proper executive services commands, and starts the applications.

The application's parts 108 include interceptors 103 which once the application is started will start emitting streams of events 111 and send them to monitoring services 120 with help of an event collector service 122. The interceptors 103 emit events 111 with a destination identifier stored in a local interceptor configuration. In one embodiment, the destination identifier can be was produced by executive services 112 based on repository 106 stored connections between application event sources and monitoring applications. As will be discussed later herein, the destination identifier can identify a location where events 111 will be later processed.

In one embodiment, each machine includes driver services 118 which has the event collector service 122. The event collector service 122 serves as a sink for the events 111 emitted. The event collector service 122 sorts the events by their destination, and sends them in batches to monitoring services 120 for processing. Monitoring services 120 may perform any of a number of functions, such as in-memory aggregation on received event streams and storing resulting processed event streams to an event store 124. Alternatively, events streams may be passed on to another event destination. In some embodiments, processing may include functionality for using aggregated events to adaptively control the applications modeled by the application models 104.

Events emitted by interceptors 103 can be processed, including aggregation or other processing, on the same application node. In one embodiment, a node may be a particular computer system. In one embodiment, processing may be performed inside the event collector service 122 of a computer system, before sending the events to the monitoring services 120. While a single monitoring services 120 and single event store 124 have been illustrated in FIG. 1A, multiple monitoring services and event stores may be used, as will be illustrated in more detail below. Additionally, aggregators and other system components may be distributed across multiple nodes.

Figure 1B:
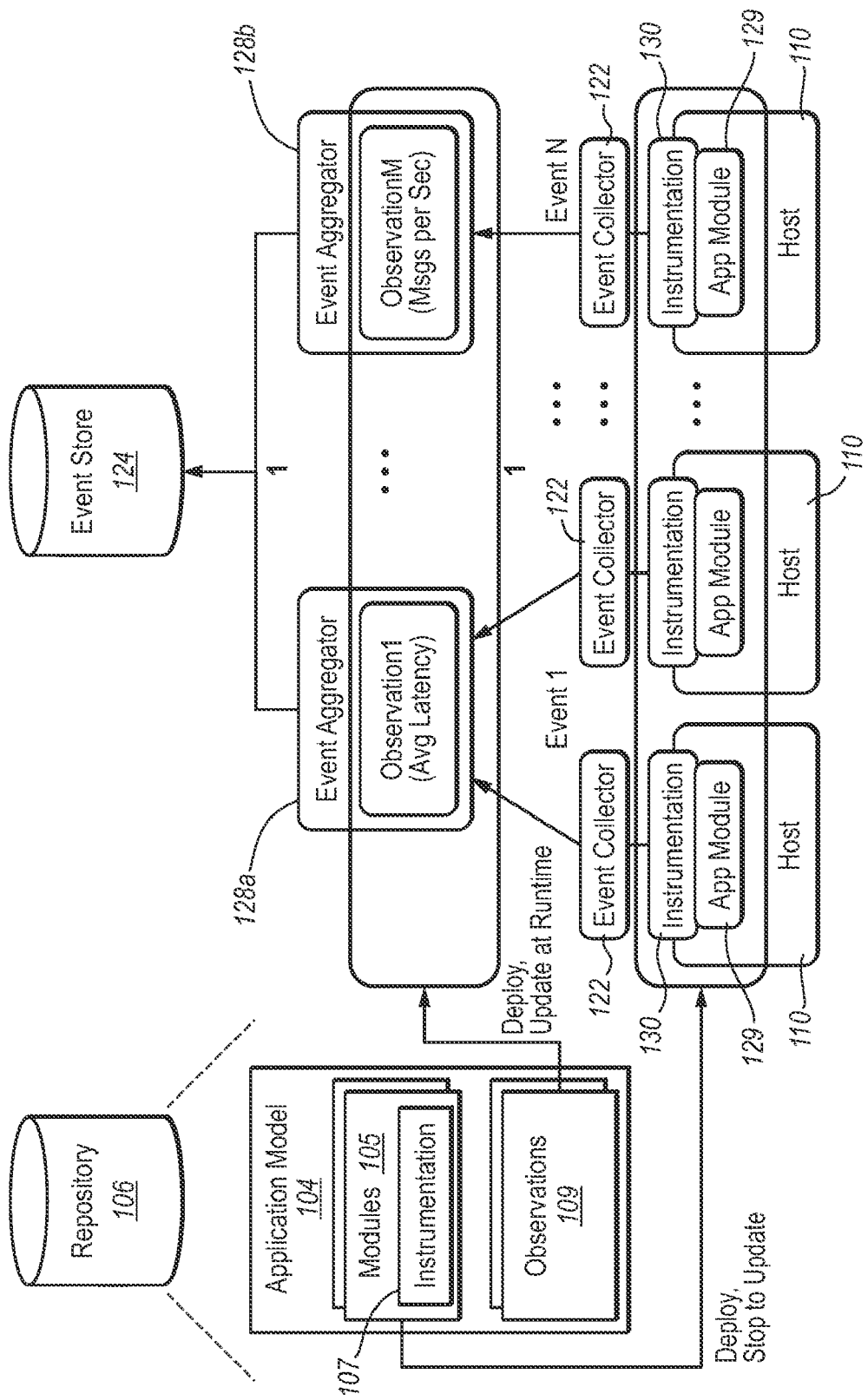
FIG. 1B illustrates event production and monitoring.

FIG. 1B illustrates how existing application code may be instrumented to enable and activate event production and observation. For an application to produce events, it should be properly instrumented. FIG. 1B illustrates that an application model 104 is declaratively defined. The application model 104 includes declarative module descriptions 105, declarative instrumentation descriptions 107, and declarative observation descriptions 109.

For application modules 129 at the hosts 110, instrumentation is accomplished by stopping the application, modifying the application model 104 by adding instrumentation models 107 including event sources or interceptors, and redeploying the application so that instrumentation 130 corresponding to the instrumentation models 107 is installed and configured at the application modules 129. The application is then restarted. Once this is done, the events start flowing from the application to the event collector services 122.

A user can create a set of observation models 109 in the repository 106. The observation models 109 can be connected to event sources defined on application models 104 as needed. Additionally, the observation models can be assigned to desired event processors such as the event aggregators 128a and 128b. Further, the observation models can be used to initiate deployment of new monitoring configurations. This can be done dynamically during runtime of applications, with no need to stop the applications to activate new observations. After a monitoring configuration is deployed and started according to an observation model 109, the events start being aggregated and stored into the event store 124. Observations may include functionality for evaluation of metrics, such as key performance indicators. In the example illustrated, the observations performed at event aggregator 128a are directed to average latency, while the observations performed at event aggregator 128b are directed to quantifying messages per second. Other indicators, though not included here, may also be evaluated.

Figure 1C:
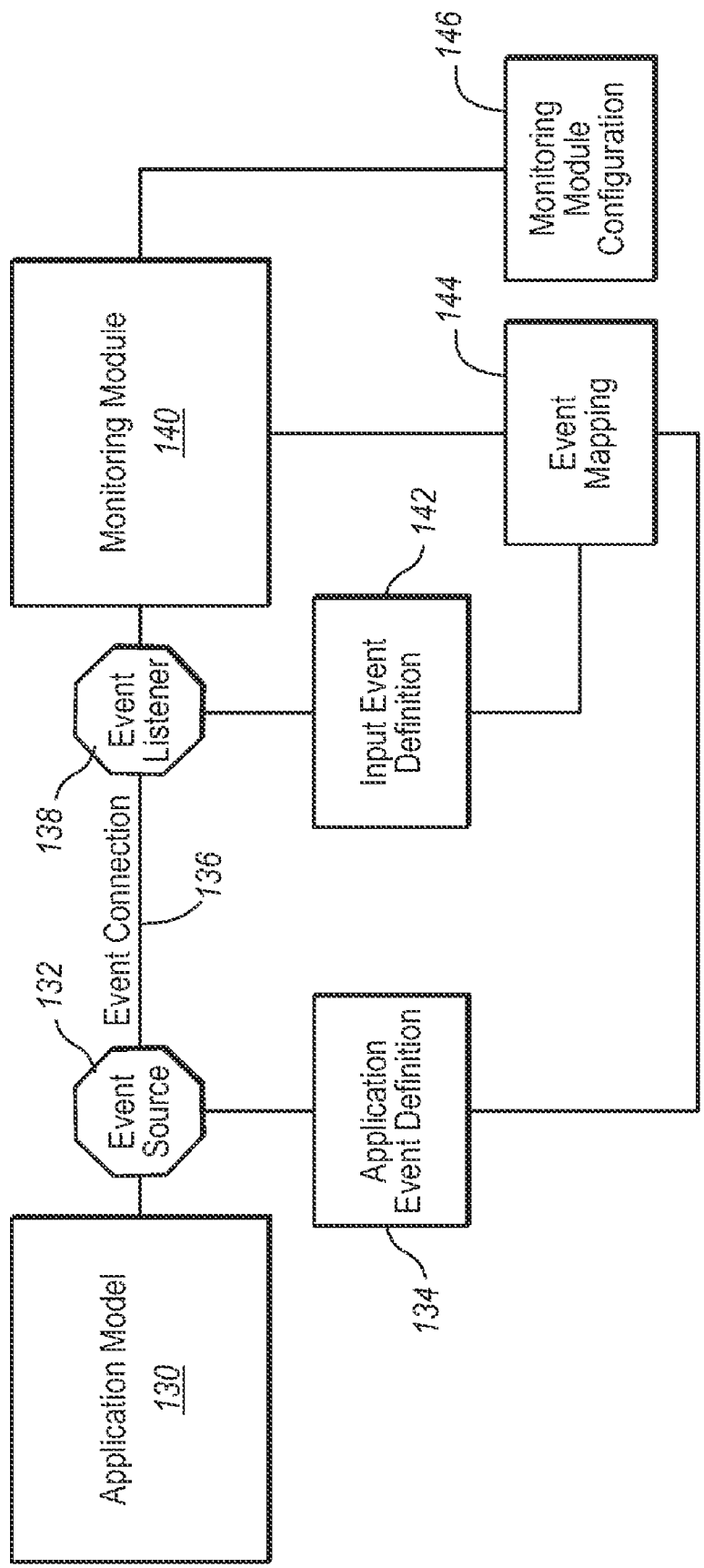
FIG. 1C illustrates application and observation models.

Referring now to FIG. 1C, an example of how monitoring of user applications by monitoring modules can be modeled in the repository 106 is illustrated. An application described by an application model 130 can emit events. In particular, an instrumented application has an event source modeled by the event source model 132. In the example illustrated in FIG. 1C, the types of events which the application can emit are represented by a collection of application event definitions 134, or event models, associated with an event source 132. These application event definitions 134 define the application specific events. Examples of events that might be modeled for an e-commerce enterprise may include: "order processed", "user error", "invoice received", etc. Events can be categorized as specific subtypes of events. For example, an event may be of a subtype category "Occurrence", "Rate", "Count", "Duration", etc. Statistics may be maintained with values corresponding to event categories for an event.

An event connection 136 specifies which event listener, represented by event listener 138 defined on a monitoring module 140, will be listening for events from an application's event source 132. Notably, event sources 132 can be connected to multiple event listeners 138.

The monitoring module 140 may not be aware upfront of all possible event types it will be processing. As such, the monitoring module 140 may include a predefined abstract input event definition set 142 and a set of event mappings 144 which associate the application event definitions 134 with the input event definitions 142.

Event mappings 144 allow for assigning monitoring module specific meanings to the application events. For instance, the monitoring module 140 calculating the duration of some operation can define two input event definitions for the events it will be accepting. For example, the monitoring module 140 may define input event definitions: "Operation Start" and "Operation Stop." In the present example, a monitored application emits two kinds of events—"Request Received" event and "Response Sent" events. By configuring event mappings of "Request Received" to "Operation Start" and "Response Sent" to "Operation Stop" events, the generic monitoring module 140, including a duration calculator, can now compute the durations of operations in application emitting arbitrary kinds of events. This allows for reusability of generic monitoring modules, and further allows for processing events from diverse sources.

A monitoring module configuration 146 may specify a type of event writer which will be used by the monitoring module 140 and the configuration of it. Such information may include, for example, event store location and connection options (including timeouts), size of event buffers, and buffering characteristics (including buffer flush intervals).

Figure 1D:
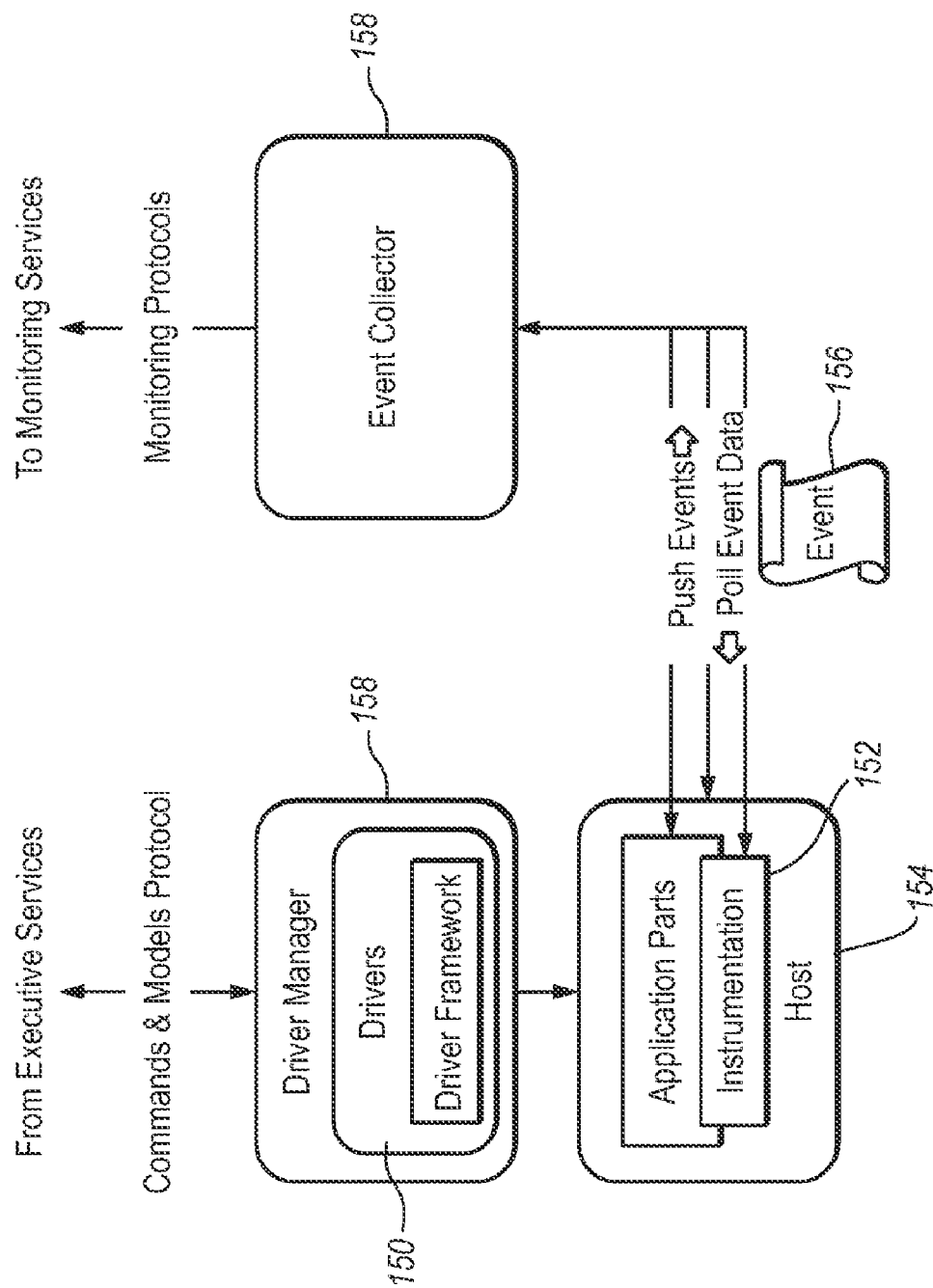
FIG. 1D illustrates event processing on application nodes.

Referring now to FIG. 1D, an example of processing events on an application node is illustrated. Application events are created on one or more computers where the monitored application runs, and gathered by an event collector 158. This is illustrated in FIG. 1D. Additionally, further details are included in U.S. patent application Ser. No. 11/844,177 titled "Monitoring Distributed Applications" filed on Aug. 23, 2007, and incorporated herein by reference in its entirety.

When the application gets configured through drivers 150, the event-generating instrumentation 152 is configured for execution within the host 154 the application runs under. This instrumentation 152 is created using interceptors which emit events 156 in response to some actions taken by the application, such as workflow activity execution or messaging endpoint receiving/sending a message, and monitors which can help with polling of current system values like performance counters. The instrumentation is configured based on event source models attached to application models.

An application computer or node under control of the framework has an event collector 158 service. The event collector 158 is tasked with collecting events emitted by applications and other event sources running on a node. The event collector 158 forwards the events to the right event processor where the actual event processing will take place.

The event collector 158 may be configured based on models 104 in the repository 106 (See FIG. 1A). The event connections 136 (FIG. 1C) between application parts models 130 and the monitoring module 140 models allow event collector 158 to determine the location of the event processor where the events should be sent. Notably, each event type may be processed, in some embodiments, at different event processor nodes.

In one embodiment, the event collector 158 performs event buffering and sends the events to event processors in batches for improving throughput. The event collector 158 can also perform some initial preprocessing of events, like simple filtering, aggregation, logical composition, etc. The event collector 158 may also reduce the number of connections from application nodes to event processor instances.

Figure 1E:
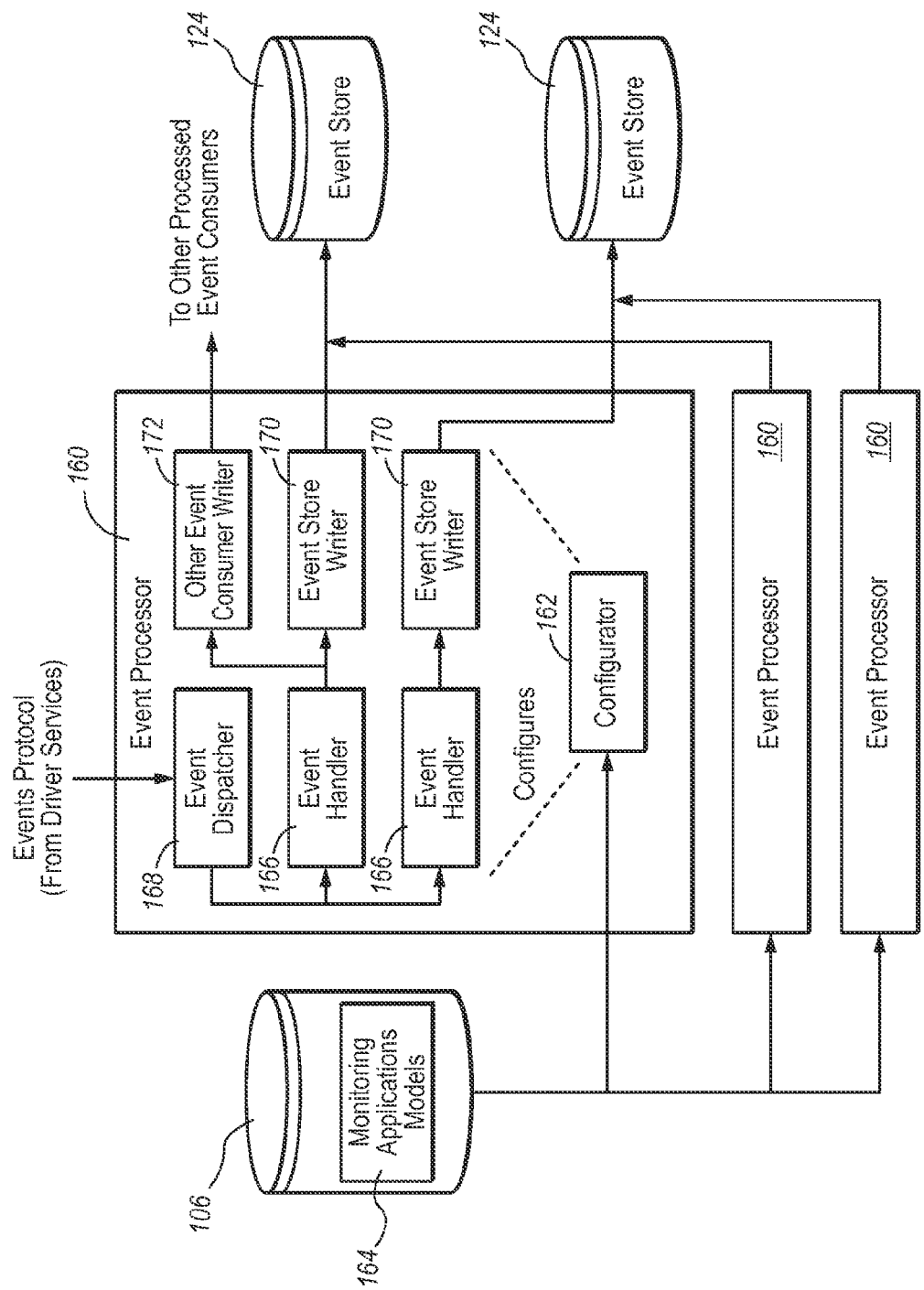
FIG. 1E illustrates an example of monitoring services.

Referring now to FIG. 1E, an example of monitoring services is illustrated. A model driven event processor 160 is a host controlling execution of monitoring applications. When the event processor 160 starts, it uses a configurator 162 to initialize the monitoring configuration. Further, the configurator 162 is invoked by a deployment/undeployment workflow running under the framework command processor to deploy/undeploy monitoring modules when the monitoring application gets deployed/undeployed.

The configurator 162 reads the monitoring applications models 164 from repository 106. A monitoring application model 164 contains a set of monitoring modules models. The monitoring applications are deployed the same way other user applications are deployed. In particular, applications may be deployed through lifecycle transitions workflows executed under control of the framework command processor.

The configurator 162 deploys each monitoring module assigned to an event processor 160 producing a runtime event handler 166 by instantiating the event handler object based on the monitoring module model 164. Deployment of a monitoring module includes adding the event handler 166 to an event dispatcher's 168 event dispatch table, keyed by a reference to an event definition specified in monitoring modules' event mappings. This effectively creates a subscription through which events will be delivered to event handlers 166. Similarly, the monitoring module 140 (see FIG. 1C) can be undeployed by deleting its corresponding event handler 166 from the dispatch table.

The event dispatcher 168 routes the events to event handlers 166 based on an event routing dispatch table which maps the input event type to a list of event handlers 166. For every event handler 166 in the list, a new work item gets queued to a thread pool, with the event for processing by the event handler 166. As such, events may be processed by event handlers 166 in parallel, taking advantage of multiple CPUs present in a system.

Some input events can be aggregated by single event handler 166 in memory before writing the resulting event output. This may result in event stream intensity reduction and allow for improved event processing performance. Raw input events come as an input to the event handler 166, and are processed. The result of this processing is stored into a private event handler's in-memory data structure, which accumulates the data until enough events have been processed. When this occurs, an output aggregate event can be emitted. This may including passing events to an event handler's event writer.

An event writer may be an event store writer 170 which will store the processed event straight to an event store 124. In alternative embodiments, the event writer may be another kind of writer 172 which can pass the event to different components of the system, such as to another event processor, allowing for building a hierarchical event processing system.

Figure 1F:
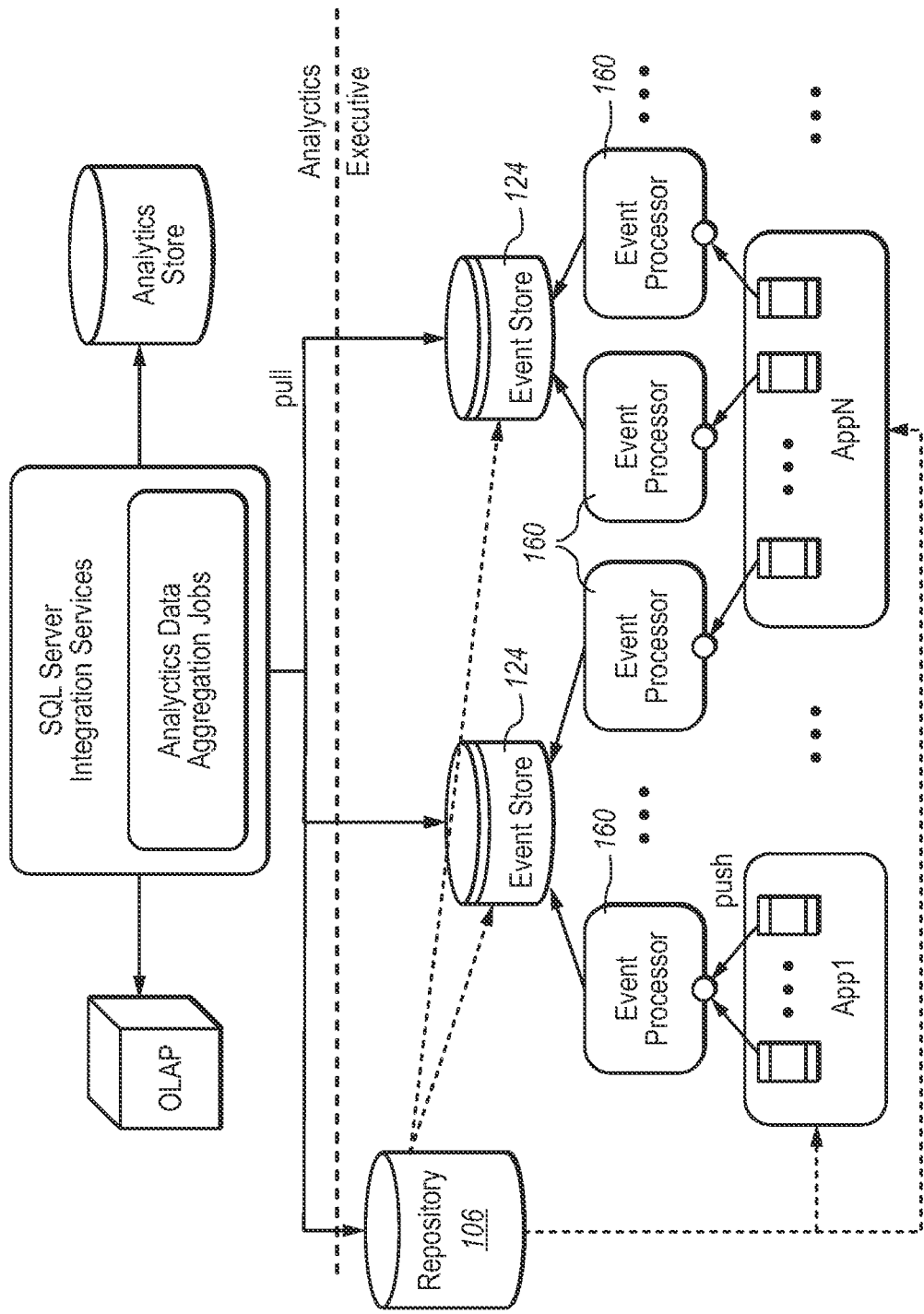
FIG. 1F illustrates a multilevel event processing system.

The system can include multiple event processors 160 and multiple event stores 124. This, combined with in-memory event aggregation capability allows for configuring of scaled out event processing systems capable of handling very intensive event streams. The sample multilevel event processing system can be implemented as depicted as in FIG. 1F.

Events in event store 124 have an identifier on the event source in application model it was generated from. This way, the Analytics tools can query the event store 124 and locate the events only related to particular applications, by filtering through list of application event sources, and produce useful reports and other visualizations.

For every application's regular entry point (like Web Service endpoint) it is possible to automatically generate default event source models and their corresponding observation applications which will cause every application deployed through executive services to have basic (default) set of monitoring present (i.e. events being emitted and processed) at no additional development cost.

Figure 2:
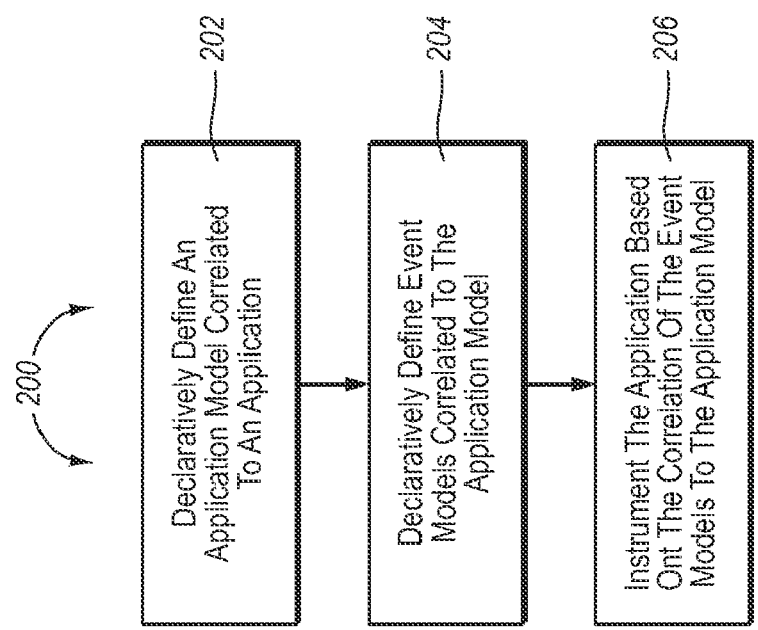
FIG. 2 illustrates a method of enabling events.

Referring now to FIG. 2, a method 200 is illustrated. The method 200 illustrates acts for enabling events from applications. FIG. 2 illustrates that the method 200 includes declaratively defining an application model correlated to an application (act 202). In the example illustrated, the application model describes operations of the application. FIG. 1A illustrates example of application models 104 defined declaratively and stored in a repository 106.

The method 200 further includes declaratively defining one or more event models correlated to the application model (act 202). The event models describe application execution locations where events are desired to be emitted in the execution of the application. The event models may be included, for example, in the instrumentation models 107 illustrated in FIG. 1B.

Based on the correlation of the event models to the application models, the method 200 further includes instrumenting the applications with instrumentation code to cause the application to emit events at the execution locations (act 206). FIG. 1B illustrates instrumentation 130 associated with application modules 129.

The method 200 may further include generating events by driving the applications and causing the execution of the instrumentation code. These events are illustrated in one example at 111 in FIG. 1A. In one embodiment, the instrumentation code causes events emitted to include a reference to an application model corresponding to the event. Thus, for example, the event 111 illustrated in FIG. 1A may include a reference to the application model 104. This allows for the monitoring services 120 to apply the event to an observation model 109 stored in the repository 106 to facilitate how events are handled including aggregation, routing, and storage.

As alluded to above, the method 200 may further include defining an aggregation point for events. Generated events are then routed to the aggregation point defined for the events. Defining an aggregation point for events may include defining a hierarchical event aggregation system where events aggregated at a number of aggregation point are aggregated at one or more higher level aggregation points. At the aggregation point, the events are manipulated. For example, manipulating events may include combining a number of events through logical or other operations. Manipulating events may include storing the events.

Figure 3:
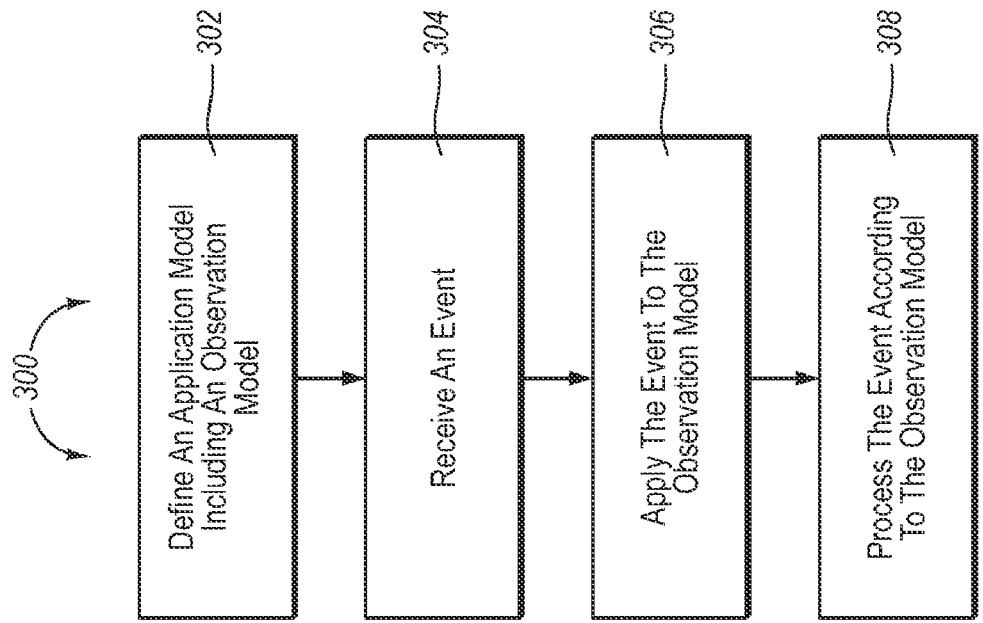
FIG. 3 illustrates a method of processing events.

Referring now to FIG. 3, a method of processing events is illustrated. The method 300 includes defining an application model, where the application model includes one or more observation models (act 302). The observation models include a correlation of events to the observation model by defining instrumentation models in the application model.

The method 300 further includes receiving an event (act 304). For example, as illustrated in FIG. 1A, the monitoring services 120 may receive an event 111 from an application part 108. The method 300 further includes applying the event to the correlated observation model based on the correlation (act 306).

The method 300 further includes processing the event according to the observation model (act 308). For example, in one embodiment, processing the event according to the observation model includes storing the event. In some embodiments, wherein processing the event according to the observation model includes aggregating events. Aggregating the events may include, for example, combining the events through logical or other operations.

In one embodiment, processing the event according to the observation model includes processing the event in aggregators arranged hierarchically. In another embodiment, processing the event according to the observation model includes sending events to an aggregator based on the event type. In yet another embodiment, processing the event according to the observation model comprises monitoring events using a generic monitoring module where the generic monitoring module references an input event definition to correlate output from an event source with input to an event listener.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment, a method of enabling events from applications, the method performed upon one or more computer processors, the method comprising;
   declaratively defining an application model correlated to an application, the application model describing operations of the application;
   declaratively defining one or more event models correlated to the application model, the event models describing application execution locations where events are desired to be emitted in the execution of the application;
   based on the correlation of the event models to the application models, instrumenting the applications with instrumentation code to cause the application to emit events at the execution locations; and
   defining an aggregation point for aggregating events wherein aggregating events comprises combining events through logical operations.

2. The method of claim 1, further comprising emitting events by driving the applications and causing the execution of the instrumentation code.

3. The method of claim 2, further comprising using emitted events to adaptively control the application.

4. The method of claim 1, wherein the instrumentation code causes events emitted to include a reference to an application model corresponding to the event.

5. The method of claim 1, further comprising:
routing the generated events to the aggregation point defined for the event.

6. The method of claim 5, wherein defining an aggregation point for events comprises defining a hierarchical event aggregation system where events aggregated at a plurality of aggregation point are aggregated at a higher level aggregation point.

7. The method of claim 5, wherein defining an aggregation point for events comprises defining an aggregation point that is distributed across a plurality of nodes.

8. The method of claim 5, wherein at the aggregation point, the events are manipulated.

9. The method of claim 8, wherein manipulating events comprises storing the events.

10. The method of claim 8, wherein manipulating events comprises generating key performance indicators from aggregated events.

11. A method of processing events, the method performed upon one or more computer processors, the method comprising;
defining an application model, wherein the application model includes one or more observation models, wherein the observation models comprise a correlation of events to the observation model by defining instrumentation models in the application model;
receiving an event;
applying the event to the correlated observation model based on the correlation; and
processing the event according to the observation model, wherein processing the event comprises aggregating events and wherein aggregating events comprises combining events through logical operations.

12. The method of claim 11, wherein processing the event according to the observation model comprises storing the event.

13. The method of claim 11, wherein processing the event according to the observation model comprises processing the event in aggregators arranged hierarchically.

14. The method of claim 11, wherein processing the event according to the observation model comprises sending events to an aggregator based on the event type.

15. The method of claim 11, wherein processing the event according to the observation model comprises monitoring events using a generic monitoring module wherein the generic monitoring module references an input event definition to correlate output from an event source with input to an event listener.

16. A monitoring system comprising:
a repository, wherein the repository comprises models of applications, wherein the models of applications include instrumentation models correlated to application execution locations where events are desired to be emitted;
one or more event processors configured to receive events from an instrumented application, wherein at least one of the one or more event processors is configured to aggregate events; and
drivers coupled to repository, wherein the drivers are configured to instrument application code based on the correlation of instrumentation models to application execution locations.

17. The system of claim 16, wherein at least one of the one or more event processors belongs to a hierarchical event aggregation structure.

18. The system of claim 16, further comprising one or more event stores configured to store events.

* * * * *